US009454756B2

(12) United States Patent
Toh et al.

(10) Patent No.: US 9,454,756 B2
(45) Date of Patent: Sep. 27, 2016

(54) SYSTEM AND METHOD FOR IMPLEMENTING OPTION-BASED TRANSFERS OF ACQUIRED DIGITAL CONTENT ITEMS

(71) Applicant: Rakuten Kobo Inc., Toronto (CA)

(72) Inventors: Tai Toh, Toronto (CA); James Wu, Newmarket (CA); Anthony O'Donoghue, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 176 days.

(21) Appl. No.: 13/930,651

(22) Filed: Jun. 28, 2013

(65) Prior Publication Data
US 2015/0006383 A1  Jan. 1, 2015

(51) Int. Cl.
*G06F 21/10* (2013.01)
*G06Q 20/12* (2012.01)
*G06F 17/24* (2006.01)

(52) U.S. Cl.
CPC ......... *G06Q 20/1235* (2013.01); *G06F 17/241* (2013.01); *G06F 21/10* (2013.01); *G06F 2221/0773* (2013.01); *G06F 2221/2141* (2013.01); *G06F 2221/2151* (2013.01)

(58) Field of Classification Search
CPC .......... G06F 3/04883; G06F 3/04842; G06Q 20/1235; G06Q 30/0641
USPC .......................................................... 715/863
See application file for complete search history.

(56) References Cited

U.S. PATENT DOCUMENTS

| | | | |
|---|---|---|---|
| 8,364,595 B1 | 1/2013 | Ringewald | |
| 8,398,483 B1* | 3/2013 | Brook | G07F 17/3288 463/25 |
| 8,498,939 B1* | 7/2013 | Gupta | G06Q 40/00 705/39 |
| 2006/0010075 A1* | 1/2006 | Wolf | G06Q 30/06 705/57 |
| 2006/0116942 A1* | 6/2006 | Woyke | G06Q 40/00 705/35 |
| 2010/0133339 A1* | 6/2010 | Gibson | G06Q 10/02 235/382 |
| 2010/0153195 A1* | 6/2010 | Wright | 705/14.12 |
| 2011/0231273 A1* | 9/2011 | Buchheit | G06Q 20/12 705/26.1 |
| 2013/0031643 A1 | 1/2013 | Rogel et al. | |
| 2013/0060661 A1 | 3/2013 | Block et al. | |
| 2013/0211945 A1* | 8/2013 | Po-Ching | 705/26.3 |

OTHER PUBLICATIONS

Pogue, David. Title: Reselling E-Books and the One-Penny Problem. Publisher: The New York Times. Publication Date: Mar. 14, 2013. URL: http://pogue.blogs.nytimes.com/2013/03/14/reselling-e-books-and-the-one-penny-problem/.*

* cited by examiner

*Primary Examiner* — Matt Kim
*Assistant Examiner* — David Luu
(74) *Attorney, Agent, or Firm* — Oblon, McClelland, Maier & Neustadt, L.L.P.

(57) ABSTRACT

Examples described herein include a computing system or environment that enables the user to acquire an option to re-transfer a purchased digital content item at a later date. Data corresponding to the option can be recorded and linked with the user. Subsequent requests from the user to re-transfer the digital content item can be permitted or denied based on whether the user is authorized by way of having acquired the corresponding option.

18 Claims, 6 Drawing Sheets

SYSTEM AND METHOD FOR IMPLEMENTING OPTION-BASED TRANSFERS OF ACQUIRED DIGITAL CONTENT ITEMS

TECHNICAL FIELD

Examples described herein relate to a system and method for implementing option-based transfers of acquired digital content items.

BACKGROUND

Digital content has become pervasive, in that consumers can now purchase various types of digital content items from numerous network or online sources. The distribution of digital content often includes programmatic controls to preclude users from distributing the content themselves.

DETAILED DESCRIPTION

Figure 1:
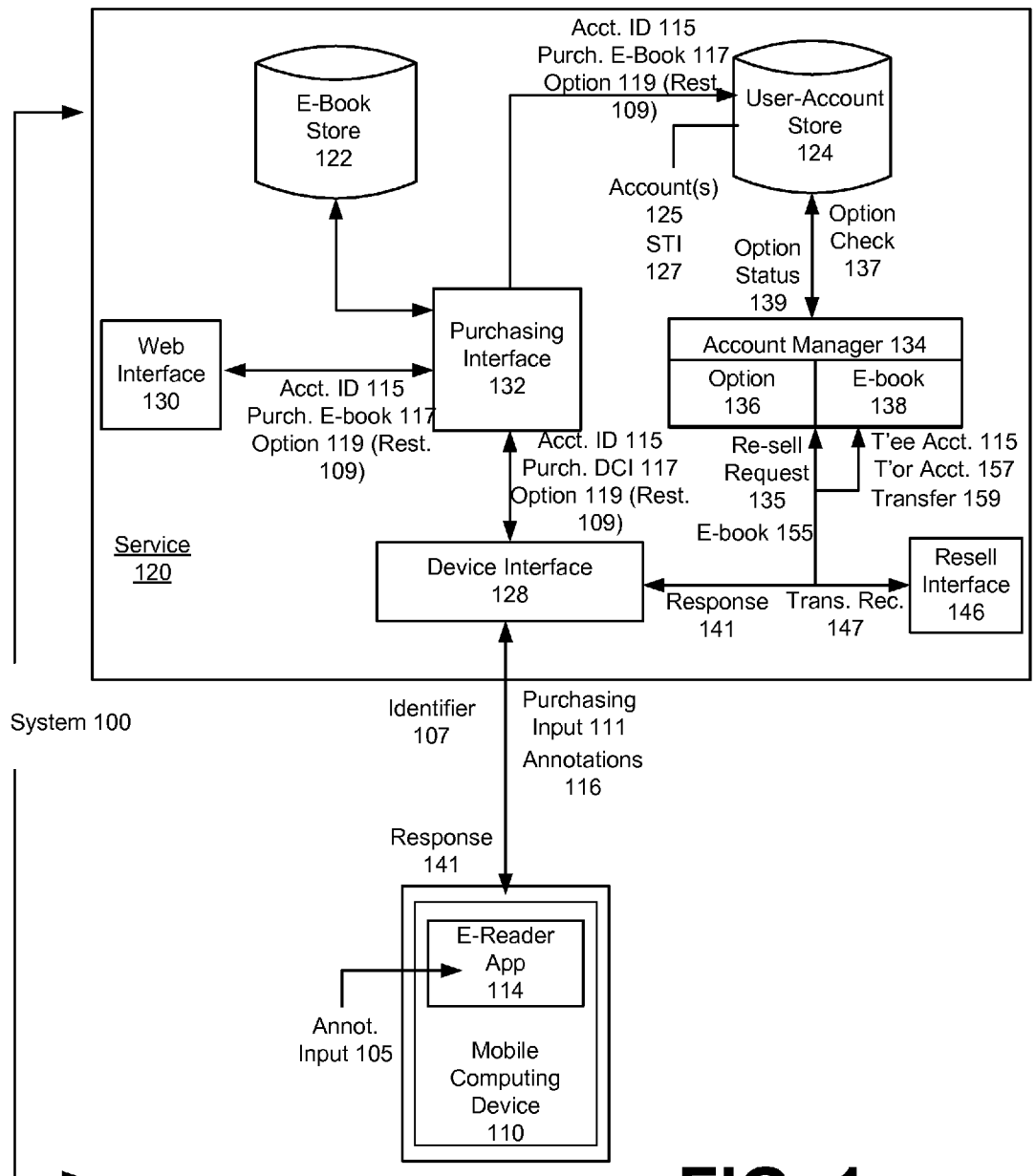
FIG. 1 illustrates a system for enabling resale of digital content items such as e-books, according to an embodiment.

Examples described herein include a programmatic mechanism for authorizing a user to re-transfer a digital content item. According to examples provided herein, the programmatic mechanism includes a data item, corresponding to an option, that can be used to authorize the user to re-transfer a purchased digital content item at a later date. With respect to examples described herein, digital content items can include, for example, media files for songs, television shows, movies, e-books, and digital comic books. While numerous embodiments described herein make reference to e-books, it should be appreciated that e-books are just one example of a digital content item for use with examples as described, and embodiments described herein are applicable to digital content items other than e-books, such as songs (or albums), videos (e.g., movies, television shows, video clips, music videos, etc.), or other works that can be embodied in a digital medium and subject to copyright laws.

"E-books" are a form of an electronic publication that can be viewed on computing devices with suitable functionality. Multi-function devices, such as cellular-telephony or messaging devices, can utilize specialized applications (E.g., e-reader apps) to view e-books. Still further, some devices (sometimes labeled as "e-readers") can be centric towards content viewing, and e-book viewing in particular.

In some embodiments, a system and computer-implemented method are provided for enabling option-based resale of digital content items. Examples described herein recognize that one of the commercial shortcomings in the purchase of digital content items amongst consumers is that consumers often lack the ability to re-sell items that they have purchased, particularly as compared to traditional approaches where content is carried on a corresponding media (e.g., book, album).

Generally, digital content items that are communicated as files amongst computers in network environments require numerous digital rights management safeguards that are designed to preclude unauthorized replication and distribution. Thus, consumers typically do not have the ability to re-sell or transfer purchases of digital content items. Among other benefits, examples described herein provide consumers with an option that enables them to re-sell or transfer (e.g., gift) a digital content item that they have purchased.

Examples described herein include a computing system or environment that enables the user to acquire an option to re-transfer a purchased digital content item at a later date. Data corresponding to the option can be recorded and linked with the user. Subsequent requests from the user to re-transfer the digital content item can be permitted or denied based on whether the user is authorized by way of having acquired the corresponding option.

According to some examples, a response to a user request to transfer a digital content item includes determining, from data stored in association with the user account, if the user elected to have a corresponding option to authorize the re-transfer for that particular digital content item. Based at least in part on whether the data indicates that the user elected to have such an option, the transfer of the right of possession of the digital content item is implemented. The transfer includes disassociating the digital content item from the user's account and associating the digital content item with an account of the second user.

In another example, a user can operate a device to communicate with a network service in order to purchase a right to transfer digital content items. For one or more digital content items that the user purchases, the user is offered an option to transfer right of possession to the digital content item. The right of transfer can be effective at a time that is subsequent to when the digital content item is purchased. The device is provided an interface in which the user can select individual digital content items from the user's collection for re-transfer (e.g., re-sell or gift). In response to the user attempting to select one of the digital content items for transfer, a programmatic determination is made as to whether the user has the right to transfer that item (based on the user having previously acquired the option). The user can transfer the digital content item in response to the determination that the user acquired the right to re-transfer the particular digital content item.

As used herein, a transfer in the right of possession is intended to mean that the right of a given user to enjoy or otherwise consume a digital content item is transferable. A transfer in the right of ownership to a particular digital content item can constitute a transfer in the right of possession. However, many examples described herein recognize that consumers do not often purchase true ownership to individual content items, as various digital rights management rules and laws preclude the user from truly owning a purchased copy of a digital content item. For simplicity, some examples may be described in the context of purchasing a digital content item (such as an e-book), and such example should be read in context in which what is actually purchased is a right of possession that permits the user to enjoy or otherwise consume (e.g. read, playback, etc.) a digital content item.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

FIG. 1 illustrates a system for enabling re-transfer of digital content items such as e-books, according to an embodiment. In an example of FIG. 1, system 100 includes a mobile computing device 110 and a network service 120. The network service 120 may include multiple servers and other computing resources that provide various e-book services, including services in which e-books are sold, re-sold, shared, downloaded and/or stored. The mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader application 114 that links the device to the service 120 and enables e-books provided through the service to be viewed and consumed.

In some implementations, the mobile computing device 110 is equipped with hardware and software to optimize reading electronic content, including e-books. For example, the mobile computing device 110 can have a tablet like form factor, although variations are possible. In some cases, the mobile computing device 110 can also have an E-ink display.

The network service 120 can include a device interface 128, which communicates with individual devices that access the service. Among other resources, the network service 120 can include an e-book store 122 and a user account store 124. The user account store 124 can associate mobile computing device 110 with a user and an account 125. The account 125 can also be associated with one or more e-books, which can be stored in the e-book store 122. As described further, the user account store 124 can retain metadata for individual accounts 125 to identify e-books that have been purchased or made available for consumption for a given account. As described with many examples, the metadata can include supplemental transaction information 127, such as whether the user has purchased or otherwise acquired the right to re-transfer an e-book.

The mobile computing device 110 may be associated with the user account 125, and multiple devices may be associated with the same account. As described in greater detail below, the mobile computing device 110 can store e-books that are purchased or otherwise made available to the user of the mobile computing device 110. The mobile computing device 110 can also locally store other metadata and account information, such as meta-data that identifies which e-books the user has the option to re-transfer (e.g., re-sell e-book).

In some embodiments, the network service 120 communicates with an application or other functionality provided on the mobile computing device 110 in order to enable a user conduct purchasing activity for digital content items made available from or through the service 120. Specific examples of purchasing activity that can be enabled for mobile computing device 110 include the ability to purchase or otherwise download digital content item, such as e-books, as well as the ability to re-sell or transfer rights to such digital content items to other users. Still further, other types of activities that can be enabled for mobile computing device 110 include an ability to share an experience with the digital content item with other like-minded users.

According to some embodiments, network service 120 can include the web interface 130, a purchasing interface 132, and an account manager 134. The purchasing interface 132 can provide functionality to enable users to access and utilize the e-book store 122. The purchasing interface 132 can be provided as, for example, an online store which interfaces or otherwise uses the e-book store 122. The purchasing interface 132 enables a user to perform various kinds of purchasing activity, including activity to search for e-books, read reviews, make purchases for e-books, and purchase or otherwise acquire right to re-sell purchased e-book. For example, the user can purchase an e-book by making payment and then downloading a digital copy of the e-book to a device associated with the user's account. The purchasing interface 132 can include functionality for linking a user account so as to enable payment, as well as to link a purchase or otherwise downloaded digital content item with the user's account 125. In some examples, multiple devices may be associated with the user's account 125, and the purchased digital content item can be downloaded and/or made available to each device that is associated with the particular user account.

In implementation, mobile computing device 110 can be operated to communicate with device interface 128 to access the purchasing interface 132. For example, the user can operate the mobile computing device 110 to access the online bookstore for an e-reader, or alternatively, for a tablet on which an e-reader application is provided. In one implementation, the user can operate an application on the mobile computing device 110 which specifies an identifier 107 that can be used to determine a user's account. For example, the application running on the mobile computing device 110 can be associated with a login that is shared by the user's account, or alternatively the network service one 110 can use an identifier 107 transmitted by the mobile computing device 110 to link to the user's account (e.g., link to account identifier 115). In variations, the user can access the purchasing interface 132 (and the corresponding e-book library 122) through the web interface 130. For example, the user can access a website corresponding to network service 120, and then make a purchase of a particular digital content item using account identifier 115. Thus, according to various implementations, a user can perform different kinds of purchasing activity through, for example, either the mobile computing device 110 (e.g., application on the mobile computing device) or web browser (to access website).

In one example, a purchasing input 111 can be generated from the mobile computing device 110 in response to use input. On the network service 120, the purchasing input 111 can be communicated via the device interface 128 to the purchasing interface 132. The purchasing input 111 can be directed towards a purchasing activity, such as a search for an e-book, a request to purchase an e-book, a request to re-sell an e-book, and/or an input to purchase an option to re-sell an e-book. Alternatively, the purchasing input 111 can originate from a user accessing a corresponding website and using a web browser, and communicated to the network service 120 using a web interface 130 (e.g., web page). The purchasing input 111 can be linked to the account identifier 115 of the user, which be associated with user information stored in the user account store 124. The user information can include transaction information such as the user's credit card account etc.

According to examples described herein, a user can access the network service 120 to (i) purchase an e-book (or other form of digital content item), and (ii) acquire an option to re-sell an e-book. The purchasing of the e-book can correspond to the user requiring a right of possession to read the e-book. In one embodiment, the option enables the user to transfer that right of possession a single time, to another user. In this respect, the acquired option enables the user to treat the e-book as a real book that can be resold as a used item. In one example, the purchasing input 111 can specify (or be correlated to) the account identifier 115 and a purchased e-book 117 (e.g., specific e-book that is being purchased). Additionally, in response to the user purchasing activity 111, the user can be prompted to elect to purchase an option 119 to re-sell the purchased e-book 117.

In some embodiments, the option 119 is provided to the user at a cost. For example, the option 119 can be offered to the user at a surcharge, above and beyond the cost for the purchased e-book. The cost for option 119 can be fixed (e.g., x dollars), or based on the price of the corresponding purchased e-book 117. In variations, some or all of the cost of the option 119 can be deferred. For example, the cost of the option 119 can be based on the price that the user is able to re-sell the corresponding e-book.

Still further, under variations, the option 119 is provided with a set of restrictions 109. The set of restrictions 109 can control facets as to how the option is used. In one implementation, the option 119 can restrict the user as to when the corresponding e-book can be transferred. For example, the user may be precluded from transferring the right of possession to the e-book under following examples: (i) until a certain time period has passed, or (ii) within a defined window of time.

The purchasing interface 132 can record the user's purchasing activity in connection with, for example, a purchased e-book 117. Thus, for example, when the user elects to purchase an e-book 117, the transaction can be recorded in the user account store 124 using the account identifier 115 and an identifier for the purchased e-book 117. Likewise, when the user elects to acquire the option 119, the purchasing interface 132 can record the option 119 in the user account store 124 as supplemental transaction information 127. In this way, the option 119 can be stored in association with the corresponding e-book 117. The user can also acquire the option 119 subject to one or more restrictions 109, as described above.

As described with various examples, the option 119 is usable by the user at a subsequent time, for purpose of enabling the user to re-sell a purchased e-book (or other digital content item). The resale of the purchased e-book can correspond to the user, transferring a right of possession to consume (e.g., read) an e-book. The account manager 134 can manage the user's rights with respect to re-selling e-books, or otherwise exercising options for re-selling e-books.

In one embodiment, a user can make a request 135 to re-sell a previously purchased e-book 155. For example, the user may make the request through the application 114 running on the mobile device 110. The account manager 134 can include an option management process 136. In response to receiving the request 135, the option management process 136 checks to determine whether the user has acquired the option 119 for that e-book 155. In one implementation, the option manager 136 determines whether the option 119 exist for that user by checking the user's account information, maintained by the user account data store 124. The option management process 136 can determine option status 139 for the specified e-book using the account information.

Additionally, the option manager 136 can programmatically enforce restrictions 109 on the use of the option 119. The restrictions 109 can limit, for example, when the user can re-sell the corresponding e-book. For example, the restriction 109 may preclude the user from re-selling the e-book until a designated period of time has passed (e.g., time from purchase of corresponding e-book, set date, for a set duration from when the option is acquired etc.). As another example, the restriction 109 can set the number of times that the user can transfer the e-book (e.g., once or multiple times).

In response to an option check request, a response 141 may be communicated by the account manager 134 to the mobile computing device 110, via the device interface 128 (or alternatively, to the user via the web interface 130). The response 141 may correspond to an approval or denial of the re-sell request. For example, if the request is approved, a transaction record 147 can be generated for the particular e-book, based on user input, and the user can communicate the transaction record 147 to other individuals. In one implementation, the user may be provided access to re-sell interface 146 for a particular e-book. If the user has acquired the option to re-sell the e-book, the user may be enabled to communicate a transaction record 147 to the re-sell interface 146. The re-sell interface 146 can correspond to an online environment where used e-book transactions can take place. Alternatively, the transaction record 147 can be communicated through other communication mediums, such as to a specific user by way of electronic communication (e.g., e-mail, post the thread etc.).

In variations, restrictions 109 provided with the option 119 provide that the option is exercisable by the user for a given duration or window of time. A given duration of time can, for example, exclude a time after which the purchase has been made. For example, the user may be precluded from exercising the option for one week after making the purchase. Alternatively, the restriction 109 can designate the exclusion period based on a predetermined date specified from the publisher. For example, the publisher of the e-book may preclude re-selling e-books until a set time or date after which the e-book was initially released to the public (e.g., preclude bestsellers from being resold until one month after publication). Likewise, the restrictions 109 can provide for the option 119 to expire after a set time, such as a given duration after when the e-book is purchase. In variations, the value of the option (e.g., the amount of the user may have to pay to exercise the option) may be adjusted based on time relative to when the option was acquired, or when the e-book was purchased. Numerous such variations are possible.

Accordingly, once the option 119 for a particular e-book is exercised, the user has the ability to transfer the right of possession to the e-book. The account manager 134 can include processes (transfer manager 138) for implementing the transfer of rights to a particular e-book from one user to another. The user can, for example, offer the e-book for resale through an online medium such as the re-sell interface 146. As mentioned, the user can generate the transaction record 147, which can be stored with the user account, and/or communicated to persons or groups who may be interested in making the purchase. Still further, the user may simply communicate informally to friends and family regarding the availability of the e-book for transfer.

Once the option is exercised, the account manager 134 can receive or monitor for a transfer request 159 from the user who acquired the option 119 (i.e., the transferor of the e-book). Alternatively, the request to transfer may originate from a transferee who purchases the e-book, provided that the transferee can show proof of sale. In some implementations, the transfer request can identify the user account 115, the particular e-book 155 that is being resold, and the account 157 of the user who is acquiring the book. For example, the user acting as the transferor can make the request to transfer the particular e-book by specifying information, such as the identifier of the particular e-book, the transferor's user account 115, and the transferee user account 157. The check as to whether the user has the right to re-sell the particular e-book can be made when the transfer request is made, or before when the transfer request is made (e.g., as a separate request). Alternatively, the transferee can make a request by specifying the transferor's user account 115, the transferee user account 157, and the particular e-book that is the subject of the transaction, along with data that indicates proof of purchase.

The e-book manager 138 can implement the transfer of rights from the user that is the transferor to the user that is the transferee. Implementation of the transfer request 159 can include disassociating the particular e-book 155 from the transferor user account. The particular e-book can be disassociated or marked so that it is no longer available for download to the user from the network service 120. Additionally, the e-book manager 138 can direct, cause or otherwise confirm that local copies of the e-book 155 that is the subject of the transfer are deleted in whole (e.g., completely removed from memory) or in part (e.g., contents deleted, but metadata such as book cover can be maintained). As an alternative or variation, the network service 120 can disassociate the particular e-books by programmatically directing the mobile computing device 110 to electronically lock the local copy of the transferred e-book.

The e-book manager 138 may also perform steps to add or associate the subject e-book to the transferee account 157. For example, the transferee may have an existing account with the user account store 124, and the e-book manager 138 may associate data in the user account store 124 to enable the transferee user to download the e-book from the e-book store 122 (e.g., through the purchasing interface 132). Alternatively, the e-book manager 138 can implement, or communicate with other processes that implement issuance of a coupon or receipt for redemption of the e-book from an online bookstore.

In implementing the transfer, the account manager 134 can also perform steps for distributing funds in connection with the transfer. In one embodiment, the transfer request 159 (or follow on communication) specifies funds that are exchanged between the transferor and the transferee. Depending on implementation, the account manager 134 can distribute funds using a variety of formulas or distribution algorithms. In one implementation, the option 119 may be sold to the transferor at a charge, and the subsequent re-sell of the e-book results in all proceeds from the sale being distributed to the account of the transferor. In another implementation, the account manager 134 implements programmatic steps to retain some or all of the proceeds from the sale of the e-book 155. The retained proceeds can be distributed to, for example, the network service 120 as an administration charge and/or to a publisher of the e-book that was resold.

According to some examples, the user can transfer a personalized e-book or digital content item. For example, the user can transfer (e.g., gift) an annotated version of an e-book. In one example, the mobile computing device 110 includes an e-reader application 114 that enables the user to create annotations by interacting with input mechanisms of the mobile computing device 110. For example, the e-reader application 114 can operate to enable the user to receive input by way of the user providing annotation input 105 via a keyboard or touch screen of the mobile computing device. In one implementation, the annotations 116 can be copied and communicated to the network service 120. When the transfer of the annotated e-book occurs, the annotations 116 can be merged or otherwise combined with an online copy of the e-book. In variations, an actual copy of the e-book with annotations is communicated from the mobile computing device to the network service 120. As a result of the transfer, the mobile computing device 110 deletes or disassociates with the e-book with the annotated comments.

Figure 2:
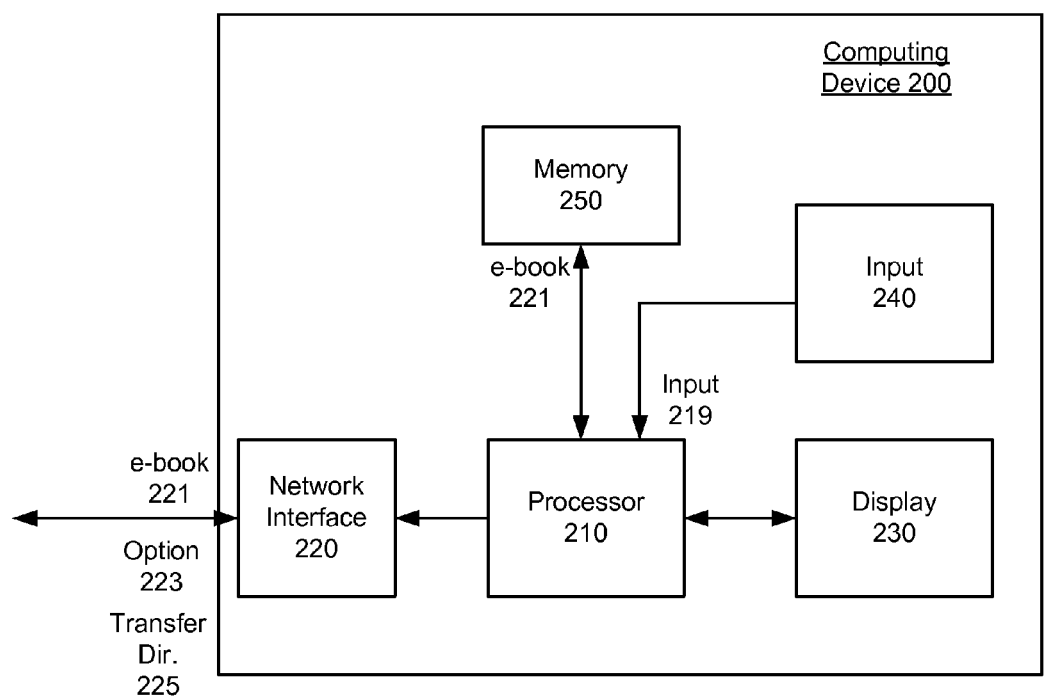
FIG. 2 illustrates an example of a mobile computing device in accordance with examples described herein.

FIG. 2 illustrates an example of a mobile computing device in accordance with examples described herein. The mobile computing device 200 can include a processor 210, a network interface 220, a display 230, one or more input mechanisms 240, and a memory 250. The processor 210 can utilize the network interface 220 to communicate with a network service 120 (see FIG. 1). Accordingly, the computing device 200 provides an example of mobile computing device 110 (as shown with FIG. 1), for use with network service 120. In communicating with the network service 120, the mobile computing device 200 can receive e-books 221 that the user has purchased or otherwise selected to download from the network service. The e-books 221 that are downloaded onto the mobile computing device 200 may be stored in the memory 250. The processor 210 may perform read operations on the memory 250 in order to retrieve stored e-books to 21, for rendering on the display 230.

The display 230 can correspond to, for example, a liquid crystal display (LCD) that illuminates in order to provide content generated from processor 210. In alternative variations, for example, the display 230 can be an E-ink display with a white-paper appearance to enhance readability.

In some embodiments, the user may operate the mobile computing device 200 to enter input 219 corresponding to purchasing activities. Such activities can include purchasing e-books 221, re-selling (or offering for resale) purchased e-books, and acquiring options to re-sell purchased e-books. In one implementation, an application on the mobile computing device enables the user to access an online bookstore. The user may have an account established with the online bookstore. The user may operate the device 200 to view and/or purchased e-books for consumption on the device 200 (as well as other devices that may be linked to the same account). For example, the user may be able to purchase an e-book by operating an application on the computing device 200. In response to purchasing an e-book, the e-book 221 may automatically be downloaded to the device 200. Additionally, the user may purchase the option to 223 to re-sell the book. In some variations, the option 223 can be stored locally on the device 200 and then communicated when the user requests to transfer rights to the corresponding e-book. The use of the option 223 (e.g., user tries to re-sell corresponding e-book) can be subject to restrictions, such as restrictions that define when the e-book can be resold, as well as restrictions that limit the number of times that the e-book can be transferred (either globally, or with one option). For example, the user may purchase the e-book 221, and then store a data item corresponding to the option 223 on the device. When the user elects to use the option 223 to re-sell the e-book, the data item is communicated to the network service 120 (see FIG. 1), and subsequent resale/transfer activity can take place.

In addition, once the e-book is transferred, the computing device 200 can receive transfer directives from the network service 120. The transfer directives 225 can cause, for example, any one or more of the following: (i) delete the local copy of a specified e-book that was transferred, (ii) lock contents (e.g., preclude viewing of some or all pages of an e-book) of an e-book that was transferred, or (iii) lock/delete contents (e.g., all pages) or portions thereof of the transferred e-book.

Figure 3:
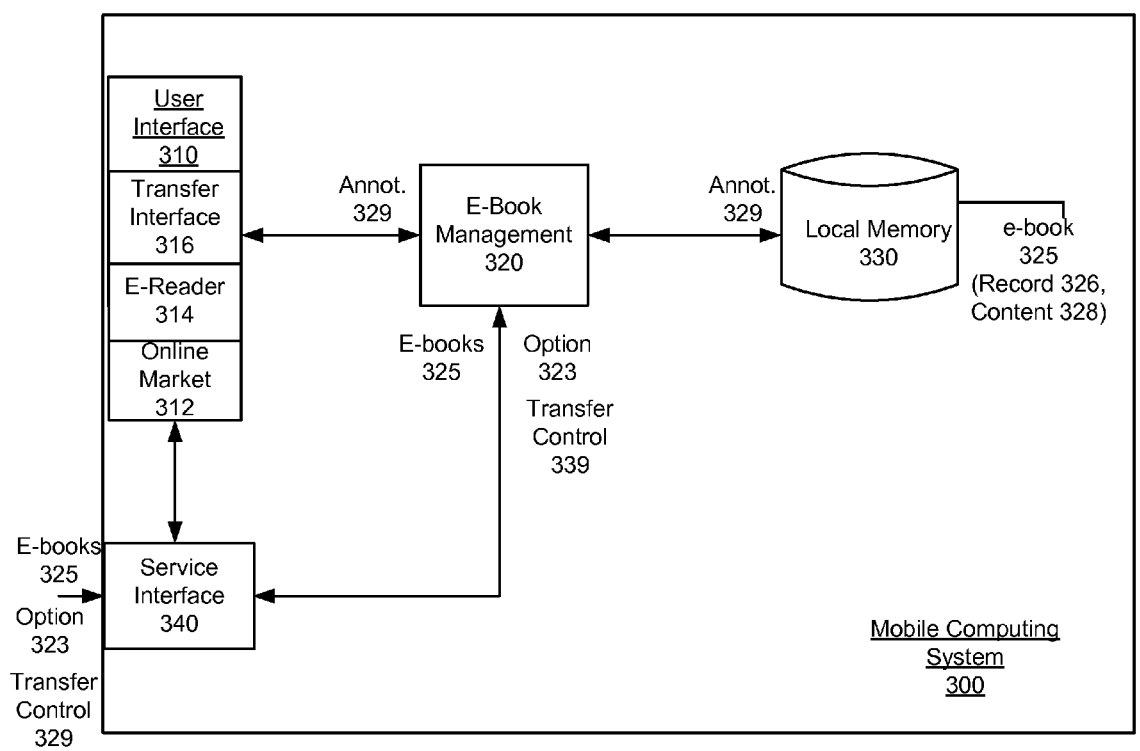
FIG. 3 illustrates a device system for enabling option-based resale of e-books, according to one or more embodiments.

FIG. 3 illustrates a device system for enabling option-based resale of e-books, according to one or more embodiments. In reference to FIG. 3, a mobile computing system 300 can implement programmatic components for implementing purchasing activities that include purchasing e-books, acquiring options to re-sell purchased e-books, and further implement transfer of rights to purchased e-books. The mobile computing system 300 can implement some or all of its purchasing activities through communications with an e-book service (such as network service 120, shown in FIG. 1). In some implementations, the mobile computing system 300 can be implemented as an application that runs on a mobile computing device (e.g., such as shown by FIG. 1 or FIG. 2). In a variation, some or all of the functionality described with the mobile computing system 300 can be implemented on or through a network service 120.

In an example of FIG. 3, the mobile computing system 300 includes a user interface 310, an e-book management module 320, a local memory 330, and a service interface 340. The programmatic components shown with the computing system 300 can be provided as part of an application that runs on the computing system 300. For example, the user can download an application onto mobile computing device, to obtain functionality such as described herein, as well as to communicate with a network service 120. Alternatively, the application can be embedded or otherwise preinstalled with other programmatic elements for providing such functionality on a computing device.

The service interface 340 includes application and logic which enables the device to use, for example, a wireless Internet connection, to connect to the network service 120 (see FIG. 1). In connecting with the service, the service interface 340 can transmit data that enables the network service 120 to identify mobile computing system 300 (or alternatively the user) so that the network service 120 can determine the account associated with the mobile computing device. The service interface 340 can be used to retrieve e-books 325 from the network service 120. For example, in identifying the mobile computing system 300 to the network service 120, the network service procures payment information (e.g., stored credit card) that can be used to charge users account when purchasing a new e-book. Each e-book 325 can correspond to a literary work, having pagination and chapter designations.

The mobile computing system 300 stores acquired e-books 325 in the local memory 330. The e-books 325 can be stored as part of records 326, which specify metadata 328 and content 332. The content 332 can include pages of the e-book, as well as graphics that are provided for content. The metadata 328 can include information that identifies the e-book, including jacket art (e.g., graphics), information about the author, title, summary, user reviews, etc.

In some examples, the user can create annotations 329, which can be stored locally and/or communicated to the network service 120. The annotations 329 can include markings, messages (e.g., typed, or digitally inked), highlights, or other user-generated content. Optionally, each annotation 329 can include metadata that references the annotation 329 to an internal location with the e-book, such as to a specific page or point of reference within the e-book. The annotations 329 can be stored with the local memory 330. As an addition or alternative, the annotations 329 can be communicated to the network service 120, where they are maintained in association with an online copy of the user's e-book.

In identifying the mobile computing system 300, the network service 120 can identify what e-books belong to the account of that device. E-books 325 that are transmitted to the mobile computing system 300 include those that are purchased from the device, or those that the user requested to download. In variations, e-books 325 can automatically be downloaded to the device in response to the occurrence of certain conditions. For example, the user can purchase an e-book on another device, and then subsequently connect to the network service 120 via the mobile computing system 300 to automatically receive their previously purchased e-book. Alternatively, network service 120 can be configured to push e-books to the mobile computing system 300, based on, for example, user account settings, subscription rules, and various other business logic consideration. The e-book manager 320 can manage the storage of downloaded e-books in the local memory of the mobile computing system 300 for subsequent use.

Among other functionality, the user interface 310 can include a local online market interface 312 to enable the user to readily access an online store for e-books. The online market interface 312 can enable the user to purchase e-books, and to effect downloads of purchased e-books to the user device. Additionally, the online market interface 312 can enable the user to purchase or otherwise acquire an option 323 for subsequent resale of a purchased e-book. The option 323 can be communicated as a data item from the network service 120 to the mobile computing system 300.

The user-interface 310 can also include, for example, an e-reader 314 which includes functionality for displaying content of an e-book (e.g., pages), as well as to enabling interaction such as page or chapter turns.

In one implementation, the user can create the annotations 329 through use of the e-reader interface 314. For example, the e-reader interface 314 can receive input from the user. In a variation, the annotations can be provided through a separate input mechanism that communicates with the mobile computing system 300.

In some embodiments, the user-interface 310 also includes a transfer interface 316. The transfer interface 316 enables the user to exercise an option 323 to re-sell a given purchased e-book 325. In one implementation, the transfer interface 316 enables the user to specify the e-book, and to communicate the intent for the user to re-sell the e-book. Optionally, the user may also operate the interface 316 to specify a price for the e-book, and a medium where the e-book is to be made available. The user can issue a transfer request 327 via the transfer interface 316, to request the network service 120 enable or otherwise provide for the transfer of the specified e-book.

The e-book management module 320 manages the storage of e-books 325 and options purchased with select e-books. When the user issues the transfer request 327, the user may specify the transferee. Depending on implementation, either the network service 120 or the mobile computing system 300 can signal that a transfer is in effect (e.g., transfer made). In response, the network service 120 can signal transfer control 339 to the e-book manager 320. The transfer control 339 can cause the e-book manager 320 to delete, disable or otherwise lock the e-book that was subject to the transfer. In a variation, the transfer control 339 can cause the e-book manager 320 to lock or delete the content portion (or portions thereof) of the e-book, so that, for example, the jacket or graphic art and other metadata associated with the e-book remains.

In an implementation in which the transferred e-book includes annotations 329, the annotations 329 can be communicated as part of the e-book that is being communicated. In this way, the user can communicate a personalized or annotated copy of a given e-book.

Methodology

Figure 4:
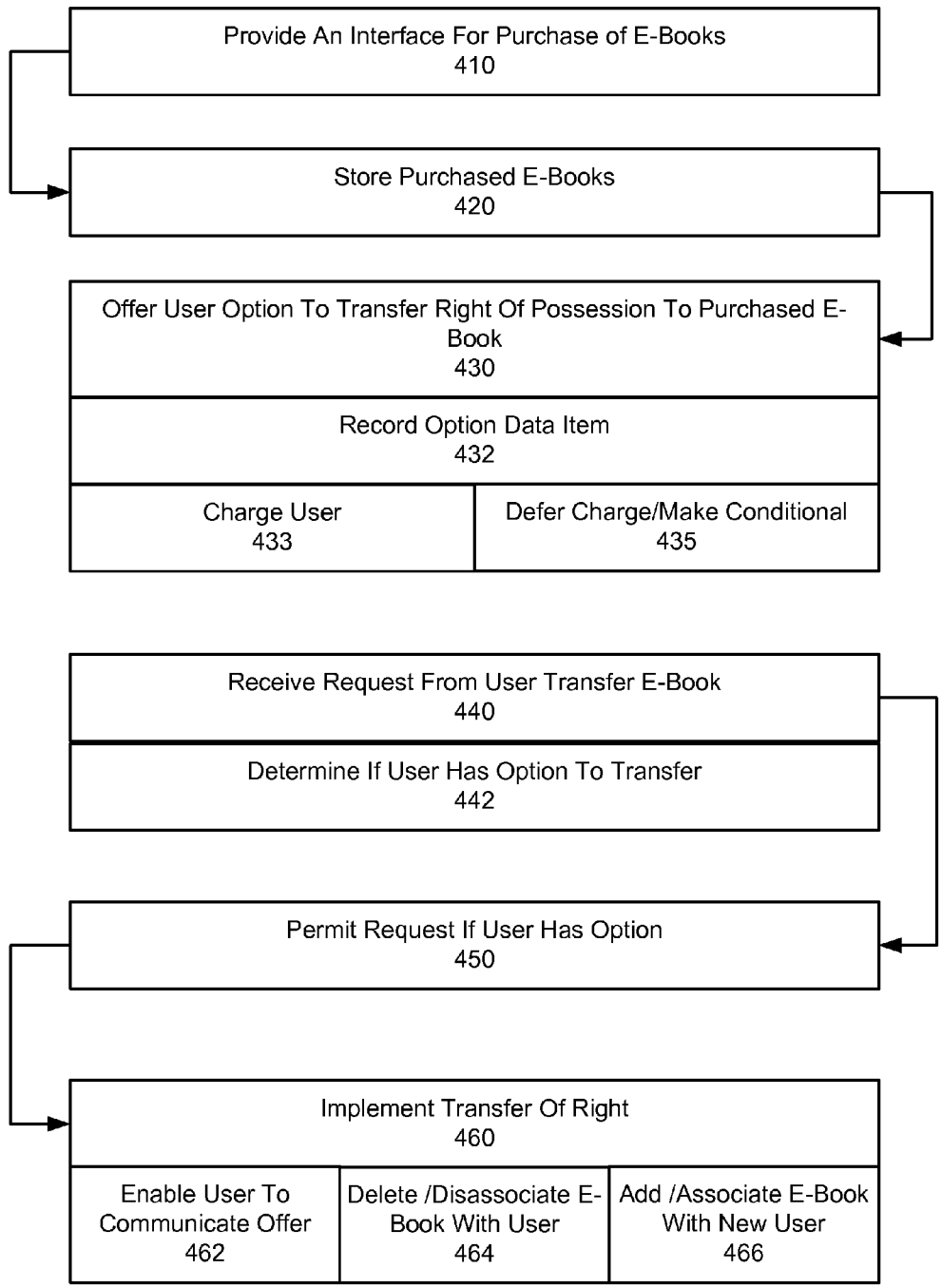
FIG. 4 illustrates an example method for operating a network service to enable users to acquire options to resale purchased digital content items.
Figure 5:
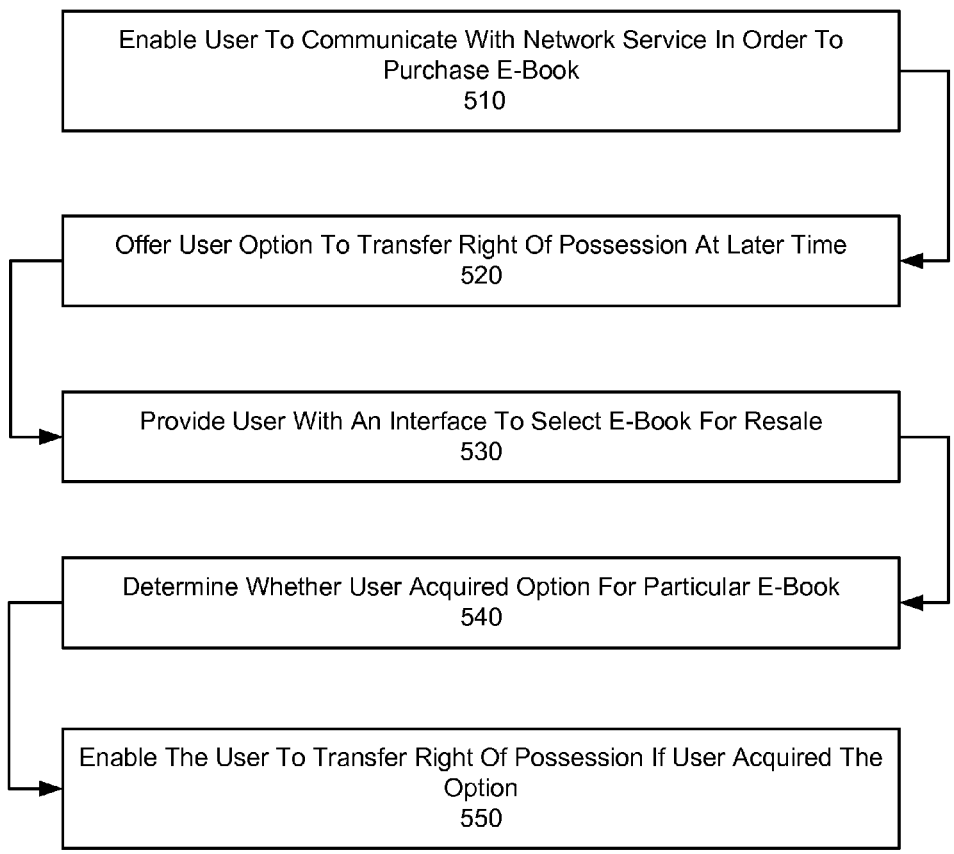
FIG. 5 illustrates an example method for enabling option-based resale of e-books on a computing device, according to one or more embodiments.

FIG. 4 illustrates an example method for operating a network service to enable users to acquire options to resale purchased digital content items. FIG. 5 illustrates an example method for enabling option-based resale of e-books on a computing device, according to one or more embodiments. Examples such as described by FIG. 4 or FIG. 5 may be implemented using components such as described with FIG. 1, FIG. 2, or FIG. 3. Accordingly, reference may be made to elements of other figures for purpose of illustrating suitable elements or components for performing a step or sub-step being described.

With reference to FIG. 4, a network service includes an interface for enabling users to purchase e-books (410). In one implementation, a web-based application can execute on a computing device and access a network service to render components of an online bookstore. In variations, the interface can be provided through a web page that uses can access using a web browser.

The purchased e-books are stored locally on a computing device that is associated with an account of the user who accesses the online bookstore (420). For example, an electronic file corresponding to an e-book can be downloaded on a user computer, or on multiple computers associated with a common user account. When the user purchases the e-book, the user has a right of possession to the e-book, from which the user can view the contents of the e-book.

In some embodiments, the user is offered through the interface an option to transfer right of possession to the purchased e-book at a later date (430). For example, the option may enable the user to transfer right of possession after the user finishes reading the e-book. In one implementation, the user is offered the option at the time the user purchases the e-book. In another implementation, the user can acquire the option at a later time, such as within a designated time period after purchasing the corresponding e-book. Still further, in another variation, the user can purchase the e-book at any time prior to transferring (or attempting to transfer) right of possession to the particular e-book.

When the user acquires the option, a data item is recorded with the user account resources that reflects the user has acquired the option (432). The data item can identify a corresponding e-book. In some variations, conditions or restrictions as to the option may also be specified in the data item that corresponds to the option. Examples of conditions or restrictions can include, for example, periods of exclusion (when the user cannot exercise the option), or pricing requirements for the resale (e.g., e-book resale must meet a minimum transfer price).

The data item corresponding to the option can be stored locally on a user device and/or with a network service. When stored on the user device, for example, the user may receive immediate or contemporaneous feedback as to whether the user can select an e-book for transfer.

When the user acquires the option, the user may be required to provide some value or consideration. In one implementation, the user must purchase the option (433). For example, the user may be required to purchase the option at the time when the e-book is purchased, or alternatively, at a later time. As an alternative or variation, some or all of the purchase price of the option is deferred and/or made conditional, subject to the user successfully transferring the right of possession to the corresponding e-book (435). In one example, the user elects to acquire the option at a first instance of time (e.g., time when e-book is purchased or during subsequent duration) without charge. But when the user elects to exercise the option at a later time, the user is charged for the option. The price of the option can be based on, for example, (i) a fixed amount, (ii) a fixed portion of the purchased e-book, (iii) a fixed portion of what the user decides to re-sell the right of possession (e.g., service and/or publisher receives proportionate fee of transfer price seller receives), (iv) a maximum or minimum price that the user wants to sell the e-book for, and/or (v) the actual price the user receives for the right of possession to the e-book.

In some variations, the user is charged a set or nominal amount at the time the corresponding e-book is purchased, then charged again once the user exercises the option. Still further, the user can be charged a set or nominal amount at the time the corresponding e-book is purchased, then charged again when the transfer is complete. The price charged to the transferor at the later time can be based on, for example, the sale price that the seller receives for the transfer.

A request can be received from a user seeking to transfer possession of an e-book (440). In response to receiving the component, programmatic components can identify whether the user has the acquired the option to re-sell the e-book (442). In one implementation, the network service 120 identifies, from the request, the user and the corresponding e-book, and then uses that information in order to determine whether the user acquired the option to re-sell the particular e-book. In another implementation, local resources on the computing device check to see if a data item corresponding to an option exists (E.g., stored with local memory) for a selected e-book.

If the user has the option, the user is permitted to transfer right of possession to the corresponding e-book. Otherwise, the user may be precluded from transferring the e-book. In one variation, if the user has not purchased the e-book, the user may be prompted or otherwise provided the opportunity to make the purchase.

With the option, the user can implement or otherwise take active steps to transfer of the right of possession for the corresponding e-book (460). With the option, the user may be enabled to communicate an offer for enabling another user to acquire the right of possession to the particular e-book (462). For example, when the user has an option for a corresponding e-book, the user may be enabled to use at least one of the network service 120, or application resources on the mobile computing system 300, to generate a transaction record that offers the e-book for sale. The transaction record can be communicated to other users, either individually (e.g., through email) or over a medium where e-books are sold or resold.

When the user is able to find a buyer, the transfer in the right of possession can include disassociating the e-book from the account or resources of the user (seller or transferor) (464). For example, the e-book can be disassociated from the online account of the user, so that the user cannot download or use the online resources to view the contents of the e-book. As an addition or alternative, the e-book can be deleted, locked or disabled from viewing on the user's devices. The user may be required to confirm that the e-book is deleted, or the network service 120 can communicate a directive in which the devices of the user delete, lock or otherwise disable the e-book from use or viewing.

The e-book can also be associated or added to the account or resources of the buyer (or transferee) (466). If the buyer has an online account with the network service 120, the account manager 134 can, for example, can link the purchased e-book to the user account. Once linked, the user can download the e-book. As an alternative or variation, the buyer can be provided a redemption code that the user can then signal to the network service 120 in order to download the e-book or otherwise have the e-book associated with the user account.

In some embodiments, when the transaction is complete, funds transfer and distribution can also occur. In an embodiment, the network service controls the distribution of some funds to the transferor. For example, the transferor may be charged a portion of the sale price as between transferor and transferee. Alternatively, payment of funds from the transferee may originate from the buyer and flow (or be managed through) the network service 120. In turn, the network service 120 can use pre-determined rules to determine the portion that is allocated to the transferor.

With reference to FIG. 5, a device of a user can be programmatically equipped to communicate with, for example, network service 120. For example, a user device (e.g., tablet) can include an application that links to the network service 120 and enables the user to view an online book store.

In some embodiments, when the user purchases an e-book, the user is provided an option to re-sell the e-book at a later date. The option can be provided for value, such as for a fixed amount that the user must pay at the time of the transaction. Alternatively, some or all of the charge for the option can be deferred or made conditional. For example, some or all of the charge for the option can be charged to the user once the transfer of the right of possession takes place, or once the user elects to exercise the option.

After the user acquires the option, the user can be provided an interface from which the user can select e-books from the user's collection for resale (530). In one implementation, the e-books that the user can select for resale are those for which the user has purchased or otherwise acquired an option. Thus, when the user selects an e-book for resale, a determination is made as to whether the user acquired the option for the particular e-book (540). In one implementation, the determination can be made locally. For example, the computing device of the user can check its memory resources for a stored data set corresponding to an option for the selected e-book. In another implementation, the determination can be made on the network service. For example, account information corresponding to an account identifier for the user can be checked for an option for the corresponding e-book. Still further, the determination for the existence of the option can be made on both the device of the user and on the network service 120.

If the user acquired the option, the user can transfer right of possession for the selected e-book (550). For example, the user can generate a transaction record, or otherwise publish or accept offers for a particular e-book.

User Interface

Figure 6:
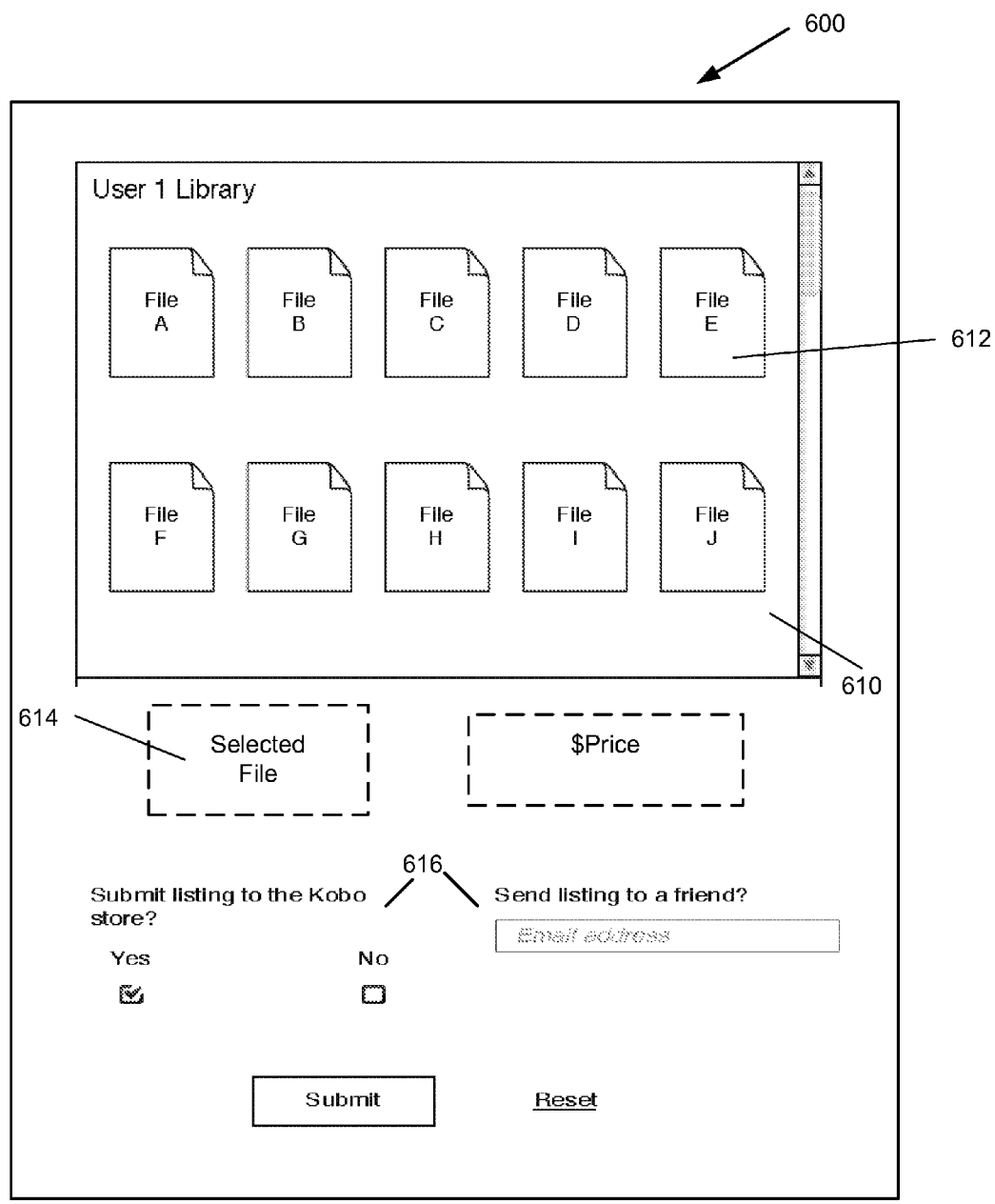
FIG. 6 illustrates an example interface for enabling a user to select e-books from a collection for resale.

FIG. 6 illustrates an example interface for enabling a user to select e-books from a collection for resale. An example interface such as shown with FIG. 6 can be provided by, for example, the user interface 310 of the mobile computing system 300 (see FIG. 3), or through the e-reader application 114 of the mobile computing device 110 (see FIG. 1).

In an embodiment, an interface 600 includes a library presentation 610 that shows individual e-books 612 of a user's digital content library. The interface 600 includes a selection feature 614 that enables the user to select an e-book from the collection for purpose of re-selling the e-book. In an example shown, the user is able to select a price for re-selling an e-book. In some implementations, restrictions may be programmatically implemented in order to preclude or influence the sale price of an e-book. For example, the network service 120 (or publisher) may charge the user for re-selling the e-book, in which case the user would have inherent motivation to keep the sale of the e-book above the minimum charge.

In one example, the user can enter input through the interface 600 to select, via the selection feature 614, a particular e-book for resale. In response to the user making the selection, a check may be automatically made in order to determine whether the user has acquired the option to re-sell the selected e-book. If the option exists, the user may be able to continue to re-sell the e-book. If the option does not exist, the selection feature 614 can indicate an error or impermissible action.

With reference to FIG. 3, for example, in determining whether the option was acquired, the e-book manager 320 of the mobile computing system may 300, for example, check the record 326 of the selected e-book 325 in local memory 330 in order to determine whether the option for the e-book is associated with the record.

In variations, the mobile computing system may 300 can communicate with the network service 120 in order to determine whether the user acquired the option. For example, with reference to FIG. 1, the option manager 136 can check the account information for the particular user in order to determine whether the option was previously acquired for the particular e-book.

In some variations, the user can also elect a forum or medium where the resale of the e-book is to be provided. In one implementation, the user can utilize the interface 600 to generate a transaction record for the e-book. The transaction record can include, for example, the title of the e-book, the seller, the price, and other conditions or descriptions (e.g., including user-generated descriptions). The user can specify the forum 616 for where the transaction record is to be published.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A system comprising:
a memory that stores a set of instructions;
one or more processors that are coupled to the memory to retrieve instructions in performing operations that include:
provide an interface for enabling a user to purchase a particular digital content item;
store data corresponding to the particular digital content item, in association with an account of the user;
enable the user to purchase an option to transfer a right of possession of the particular digital content item at an instance of time that is subsequent to when the digital content item is purchased, at a separate transaction price that includes a cost of providing the option; and
enable the user to defer payment of at least part of the separate transaction price until the user exercises the option to transfer the right of possession;
record, in association with the user account, data that indicates whether the user elected to have the option for the particular digital content item;
respond to a request from the user to transfer the right of possession of the digital content item to a second user by:
generate a transaction record that indicates the user has purchased the option to transfer the right of possession and is offering the digital content item for transfer to a group of users that includes the second user;
provide an interface to enable the user to publish the transaction record;
determine, from data stored in association with the user account, if the user purchased the option for a particular digital content item; and
based at least in part on whether the data indicates that the user purchased the option, at least partially implement the transfer of the right of possession of the digital content item, by disassociating the digital content item from the user's account, including causing multiple devices that are linked to the user's account to delete at least a portion of the digital content item.

2. The system of claim 1, wherein the user is a first user, and wherein the one or more processors:
record a transaction price between the first user and the second user for the digital content item, and
control distribution of funds to the first user.

3. The system of claim 2, wherein the one or more processors control distribution of funds by retaining, from the funds, a fee for the transaction.

4. The system of claim 1, wherein the one or more processors provide an interface from which the user can select a sale price for a transaction in which the digital content item is to be transferred to the second user.

5. The system of claim 1, wherein the one or more processors record that the digital content item was transferred, and subsequently preclude the second user from re-transferring the digital content item.

6. The system of claim 1, wherein the one or more processors associate the digital content item with an account of the second user by making the digital content item available for download by the second user.

7. The system of claim 1, wherein the one or more processors implement the transfer of the right of possession of the digital content item only after a designated duration of time from when the user purchased the right of possession for the digital content item.

8. The system of claim 1, wherein the option that is offered to the user includes one or more restrictions.

9. The system of claim 8, wherein the one or more restrictions define a duration of time during which the user can transfer the right of possession of the digital content item.

10. The system of claim 8, wherein the one or more restrictions define a number of instances in which the user can transfer the right of possession of the digital content item.

11. The system of claim 1, wherein the one or more processors enable the user to annotate the digital content item, and wherein the one or more processors implement the transfer of the right of possession by duplicating the annotations of the user into a copy of the digital content item for which the right of possession is transferred to the second user.

12. A system comprising:
a memory that stores a set of instructions;
one or more processors that are coupled to the memory to retrieve instructions in performing operations that include:
enable a user to communicate with a network service in order to purchase a right of purchase to digital content items;
for one or more digital content items that the user purchases, enable the user to purchase an option to transfer a right of possession of a particular digital content item at an instance of time that is subsequent to when the digital content item is purchased, at a separate transaction price that includes a cost of providing the option;
enable the user to defer payment of at least part of the separate transaction price until the user exercises the option to transfer the right of possession;
generate a transaction record that indicates the user has purchased the option to transfer the right of possession and is offering the digital content item for transfer to a group of users that include a second user;
provide one or more interfaces to enable the user to (i) select individual digital content items in a collection of the user for resale to a population of users, and (ii) publish a transaction record;
in response to the user attempting to select one of the digital content items for resale, determine whether the user purchased the option to transfer the right of possession of the selected digital content item; and if the user purchased the option to transfer the right of possession, enabling the user to transfer the right of possession to another user, wherein enabling the user to transfer the right of possession comprises at least partially implementing the transfer of the right of possession by at least causing multiple devices that are linked to the user to delete at least a portion of the digital content item.

13. The system of claim 12, wherein the one or more processors enable the user to transfer the right of possession to another user by communicating a record offering a transfer of the right of possession to an online medium for viewing by a group of users.

14. The system of claim 13, wherein the one or more processors provide one of the one or more interfaces with a feature to enable the user to select to communicate the record to the online medium.

15. The system of claim 12, wherein the one or more processors provide the interface with a feature to enable the user to select a price for a transfer of the right of possession for the selected digital content item.

16. A non-transitory computer-readable medium that stores instructions for enabling a transfer of rights to possession of digital content items, the stored instructions including instructions that are executable by one or more processor to cause the one or more processors to perform operations that include:

enable a user to communicate with a network service in order to purchase a right of purchase to digital content items;

for one or more digital content items that the user purchases, enable the user to acquire an option to transfer a right of possession of the particular digital content item at an instance of time that is subsequent to when the digital content item is purchased, at a separate transaction price that includes a cost of providing the option;

enable the user to defer payment of at least part of the separate transaction price until the user exercises the option to transfer the right of possession;

generate a transaction record that indicates the user has purchased the option to transfer the right of possession and is offering the digital content item for transfer to a group of users that includes a second user;

provide one or more interfaces to enable the user to (i) select individual content items in a collection of the user for resale to a population of users, and (ii) publish a transaction record;

and when the user purchased the option to transfer the right of possession, enable the user to transfer the right of possession to another user, including at least partially implementing the transfer of the right of possession by at least causing multiple devices that are linked to the user to delete at least a portion of the digital content item.

17. The system of claim 3, wherein the one or more processors control distribution of funds by distributing at least a portion of the fee to a publisher of the digital content item.

18. The system of claim 1, wherein the right of possession includes at least one of a transfer in the right of ownership of the particular digital content and a permission of the user to consume the particular digital content.

* * * * *